No. 648,087. Patented Apr. 24, 1900.
C. W. SALISBURY.
WHEEL FOR HORSELESS CARRIAGES.
(Application filed Aug. 23, 1899.)
(No Model.)
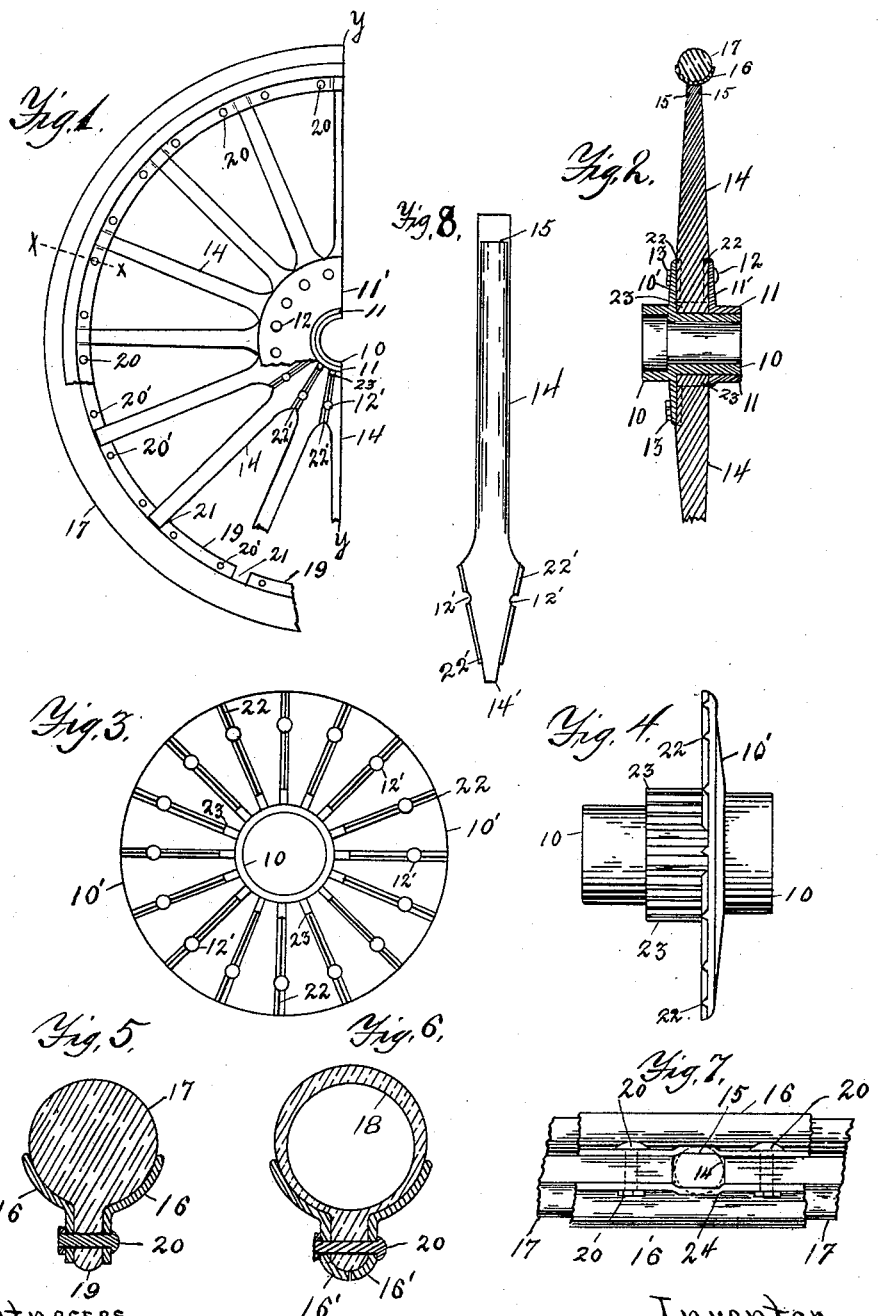
Witnesses
L. T. Baldwin.
E. C. Hunt.
Inventor
Clark W. Salisbury
By his attorneys
Harris & Baldwin

UNITED STATES PATENT OFFICE.

CLARK W. SALISBURY, OF JAMESTOWN, NEW YORK.

WHEEL FOR HORSELESS CARRIAGES.

SPECIFICATION forming part of Letters Patent No. 648,087, dated April 24, 1900.

Application filed August 23, 1899. Serial No. 728,216. (No model.)

*To all whom it may concern:*

Be it known that I, CLARK W. SALISBURY, a citizen of the United States, and a resident of Jamestown, in the county of Chautauqua and State of New York, have invented a new and useful Wheel for Horseless Carriages, of which the following is a specification.

My invention relates to wheels for vehicles wherein light weight and great strength must be combined, as in horseless carriages and the like; and the objects of my improvement are, first, to provide tongues on the inner edge of the tire between the spokes, with openings therein for attaching to the rim; second, to make the rim in two parts and in such form that the parts will clamp the tongues on the tire and the ends of the spokes, holding both firmly; third, to so form the spokes that they have their full size and strength at all the main points of strain, and, fourth, to combine these points with others in a wheel of great strength and lightness. I attain these objects by mechanism illustrated in the accompanying drawings, in which—

Figure 1 is a part of a wheel having my improvements. Fig. 2 is a sectional view of the part of the wheel shown at line $y\ y$ in Fig. 1. Fig. 3 is a front view of the back half of the hub, showing the openings and divisions for the hub ends of the spokes. Fig. 4 is a side elevation of the back part of hub shown in Fig. 3. Figs. 5 and 6 are sectional views of solid and pneumatic tires and the rim parts at line $x\ x$ in Fig. 1. Fig. 7 is a detail view of rim and tire at the entrance of the spoke and shows the spoke in dotted outline. Fig. 8 is a side elevation of spoke.

Similar numerals refer to similar parts in the several views.

10 is the back and main part of the hub, which extends through the center of the hub and has back flange 10', which extends up beside the hub ends of the spokes.

11 is the front part of the hub, having front flange 11', extending up the front side of the ends of the spokes opposite flange 10'.

12 13 are screw-bolts which pass through flanges 10' 11' and between the spokes in holes 12' 12' and hold the center part of the wheel solid, yet allows of its being taken apart at any time for repair. The V-shaped projections 22 22 on the inside of flanges 10' 11' extend from projections 23 23 on part 10 to the edge of the flange (see Fig. 4) and fit the notches 22' 22' at each joint between the hub ends of the spokes and prevent torsion, and the ends of the spokes fit the sockets between projections 23 23 and flanges 10' 11'.

14 14 are the spokes, which are left as nearly full size and strength as possible, openings 12' 12' and cuts 15 15 being the only cuts in the spoke, and they come at points where there is little or no strain. Cuts 15 15 are made on the outer sides of the rim ends of the spokes to receive rim parts 16 16; but the spoke end is left full size the other way where it enters tongue 19 in opening 21. (See Figs. 1 and 7.)

My rim is made in two parts 16 16, which I usually prefer to make as shown in Fig. 5, though the parts may be brought nearer together, as shown at 16' 16' in Fig. 6. 17 is a solid-rubber tire, and 18 a pneumatic tire, each having tongues 19 19 on their inner edges, with holes 20' 20' therein to receive screw-bolts 20 20, which hold the tire and rim securely and clamp the two rim parts, which bend out slightly at each spoke onto the ends of the spokes so firmly that they rigidly attach the tire and rim to the spokes, rubber tongues 19 19 acting as cushions for the rims in clamping the spoke ends.

This manner of making my wheel allows of the whole wheel being taken down and any part renewed and as easily put together again.

What I claim as new, and desire to secure by Letters Patent, is—

1. In a wheel for vehicles, a metal hub in two main parts, the back part having a sleeve to fit the axle and provided with projections to hold the ends of the spokes and a flange with projections thereon to prevent torsion, the front part having a sleeve to fit the back part and a flange with projections like back part, spokes suitably formed to fill the hub, bolts through the flanges and between the spokes to hold the parts, substantially as shown and described.

2. In a wheel for vehicles, a metal hub in two parts 10 and 11, part 10 having projections 23 for the spoke ends and flange 10' with projections 22 thereon, part 11 having flange 11' with projections 22 thereon, spokes 14 suitably formed to fill the hub and having cuts 15 15 for the rim parts, rubber tire 17 having tongues 19 19 on its inner edge, the rim in two parts 16 16 for attaching to the tire and spoke ends, bolts 12 and 20 to hold the parts, substantially as shown and described and for the purpose set forth.

In testimony whereof I have subscribed my name to this specification in the presence of two subscribing witnesses.

CLARK W. SALISBURY.

In presence of—
ALONZO HALLADAY,
E. F. DICKINSON.